US006981484B2

(12) United States Patent
Lampard

(10) Patent No.: US 6,981,484 B2
(45) Date of Patent: Jan. 3, 2006

(54) INTERNAL COMBUSTION ENGINE WITH DIVIDED COMBUSTION CHAMBER

(75) Inventor: Robert Douglas Lampard, Canning Vale (AU)

(73) Assignee: Barrack Combustion Process Pty Ltd., Osbourne Park, WA (US)

( * ) Notice: Subject to any disclaimer, the term of this patent is extended or adjusted under 35 U.S.C. 154(b) by 0 days.

(21) Appl. No.: 10/494,520

(22) PCT Filed: Nov. 13, 2002

(86) PCT No.: PCT/AU02/01545

§ 371 (c)(1),
(2), (4) Date: Oct. 19, 2004

(87) PCT Pub. No.: WO03/042518

PCT Pub. Date: May 22, 2003

(65) Prior Publication Data
US 2005/0051130 A1    Mar. 10, 2005

(30) Foreign Application Priority Data
Nov. 14, 2001 (AU) .................................. PR8855

(51) Int. Cl.
F02B 19/02 (2006.01)
F02B 19/10 (2006.01)
F02B 19/12 (2006.01)
(52) U.S. Cl. ....................... 123/261; 123/269; 123/292
(58) Field of Classification Search ................ 123/255, 123/261, 269, 275, 292
See application file for complete search history.

(56) References Cited
U.S. PATENT DOCUMENTS
4,372,264 A * 2/1983 Trucco ........................ 123/292
4,424,780 A * 1/1984 Trucco ........................ 123/292
(Continued)

Primary Examiner—Tony M. Argenbright
(74) Attorney, Agent, or Firm—Neifeld IP Law, P.C.

(57) ABSTRACT

An internal combustion engine 10 includes a first combustion chamber (20) in each of its cylinders (12). First fuel injector (24) injects a first volume of fuel into the chamber (20). A housing (28) defining an auxiliary combustion chamber (30) is coupled to the engine (10). The housing (28) includes a passage (32) that extends from the auxiliary combustion chamber (30) to the first combustion chamber (20). Fluid communication through the passage (32) is controlled by a valve (34). When the valve (34) is in an extended position it provides a high impedance to the flow of fluid between the auxiliary combustion chamber (30) and the first combustion chamber (20). However when in a retracted position, the valve (34) allows unimpeded fluid flow between the two chambers. An auxiliary air and fuel injector (38) to inject a fuel/air mixture into the auxiliary combustion chamber (34). Air for the auxiliary injector (38) is sourced from outside of the first combustion chamber (20), i.e. typically via a compressor or in a multi-cylinder engine one of the engine cylinders could be devoted to this task. As a piston (14) in a cylinder (12) of the engine (10) approaches top dead center during its compression stroke, fuel and air is injected into the auxiliary chamber (30), and the valve (34) is held in the extended position. A spark is delivered to the auxiliary combustion chamber causing ignition of the fuel and air mixture there within. Just prior to the piston (14) reaching top dead center, a valve controller (36) operates the valve (34) to move it to its retracted position whereby the ignited fuel and air from the auxiliary combustion chamber passes through the passage (32) into the first combustion chamber (20). At approximately top dead center the fuel injector (24) injects the first volume of fuel into the combustion chamber (20) which is very rapidly vaporised and combusted by the ignited fuel and air from the auxiliary combustion chamber (30).

24 Claims, 1 Drawing Sheet

U.S. PATENT DOCUMENTS

| | | | |
|---|---|---|---|
| 4,641,616 A | * | 2/1987 | Lampard ................... 123/292 |
| 4,785,776 A | * | 11/1988 | Tokura et al. .............. 123/269 |
| 5,085,189 A | * | 2/1992 | Huang et al. ............... 123/275 |
| 5,224,450 A | * | 7/1993 | Paul et al. .................. 123/292 |
| 5,603,298 A | * | 2/1997 | Kawamura ................. 123/292 |
| 6,073,605 A | * | 6/2000 | Matsuoka et al. .......... 123/292 |
| 2003/0056749 A1 | * | 3/2003 | Beckertgis ................. 123/292 |

* cited by examiner

INTERNAL COMBUSTION ENGINE WITH DIVIDED COMBUSTION CHAMBER

FIELD OF THE INVENTION

The present invention relates to an internal combustion engine with a divided combustion chamber, and in particular, to an internal combustion chamber having a first or main combustion chamber and an auxiliary combustion chamber.

BACKGROUND OF THE INVENTION

Divided internal combustion chamber engines having a main combustion chamber and an auxiliary combustion chamber are well known. In such engines, communication is provided at selected times between the main combustion chamber and the auxiliary combustion chamber in order to firstly inject compressed air from the main combustion chamber (during the compression stroke) into the auxiliary chamber, and then at approximately top dead centre, after ignition of fuel and the compressed air within the auxiliary chamber, allowing combustion products to flow from the auxiliary chamber into the main chamber.

This control of fluid communication has been effected by the use of a valve known as a "flow modulator". Typically the valve terminates the injection of compressed air from the main combustion chamber into the auxiliary chamber at about 25° before top dead centre. By terminating the flow of compressed air a this time, the compression ratio in the auxiliary chamber is limited to around 9:1, which is considered ideal for spark ignition. A dedicated fuel injector is provided to inject a small volume of fuel into the auxiliary chamber to be mixed with the compressed air within the auxiliary chamber in an amount to provide a slightly rich mixture At top dead centre the compression within the main chamber would reach a pressure in excess of 300 psi. However a spark plug in communication with the auxiliary chamber is timed to produce a spark shortly after 25° before top dead centre so that the air and fuel within the auxiliary chamber has been combusting for slightly less than the time required for the engine to turn from 25° before top dead centre to top dead centre. As a result the pressure within the auxiliary chamber is substantially above the pressure within the main combustion chamber.

At top dead centre, the valve opens so that the combustion products within the auxiliary chamber are energetically ejected into the main combustion chamber to initiate combustion of the fuel/air mixture therewith.

It is an object of the present invention to provide an alternate form of an internal combustion engine with a divided combustion chamber.

SUMMARY OF THE INVENTION

According to the present invention there is provided an internal combustion engine including:
  a cavity in which a fuel can be combusted;
  a body moveable within said cavity, said cavity and moveable body together defining a first combustion chamber;
  a first fuel injector for injecting a first volume of fuel into said first combustion chamber,
  a housing defining an auxiliary combustion chamber,
  a passage extending from said auxiliary combustion chamber to said first combustion chamber;
  a valve moveable between an extended position where said valve provides a high impedance to fluid flow between said auxiliary combustion chamber and said first combustion chamber, and a retracted position where said valve provides substantially unimpeded fluid flow between said auxiliary combustion chamber and said first combustion chamber,
  an auxiliary fuel and air injector for injecting a fuel/air mixture into said auxiliary combustion chamber, said fuel/air mixture comprising air sourced from outside of said first combustion chamber, and,
  ignition means for igniting said fuel/air mixture in said auxiliary combustion chamber to produce an ignited fuel/air mixture for igniting said first volume of fuel.

Preferably said engine includes a controller for controlling said engine so that said fuel/air mixture is ignited when said valve is in said extended position and prior to said moveable body moving to a position where said first combustion chamber is of minimum volume, and for moving said valve to said retracted position at a subsequent time whereby said ignited fuel/air mixture is discharged through said passage into said first combustion chamber.

Preferably said controller is arranged to maintain said valve in said extended position for a period after said igniting means ignites said fuel/air mixture sufficient so that pressure of said ignited fuel/air mixture is elevated to above pressure in said combustion chamber prior to said valve moving to said retracted position.

Preferably said valve is disposed in said housing

Preferably said valve includes an end which obstructs an end of said passage adjacent said auxiliary combustion chamber when in said extended position.

Preferably said piston includes a head, and said first combustion chamber includes a recess formed in said piston head.

Preferably said valve includes a member which extends centrally through said auxiliary combustion chamber.

Preferably said first fuel injector and said housing are juxtaposed so that fuel injected by said first fuel injector and said ignited fuel/air mixture discharged through said passage are targeted at the same point in said first combustion chamber.

Preferably said point is on said recess.

Preferably said engine includes an air compressor for providing air for said fuel/air mixture injected by said auxiliary fuel and air injector.

BRIEF DESCRIPTION OF THE DRAWINGS

An embodiment of the present invention will now be described by way of example only with reference to FIG. 1 which illustrates in section, an upper portion of a cylinder and cylinder head of an embodiment of an internal combustion engine in accordance with the present invention.

DETAILED DESCRIPTION OF THE INVENTION

Figure 1:
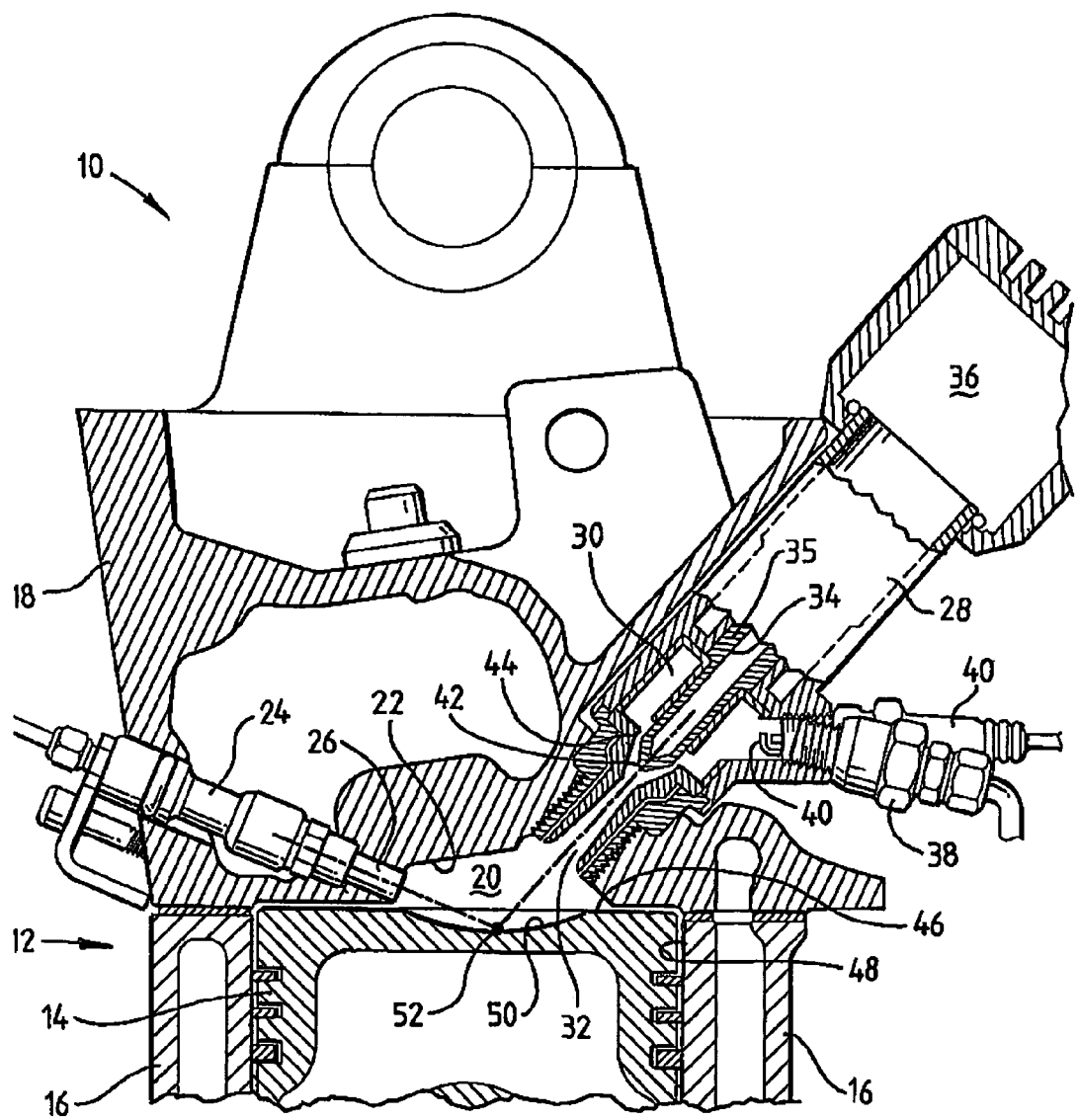

Referring to the accompanying drawing, an internal combustion engine 10 in accordance with the present invention includes a cavity in the form of a cylinder 12 which houses moveable body in the form of a reciprocating piston 14. The cylinder 12 is defined by the combination of an engine block 16 and cylinder head 18 both of generally conventional construction. A first or main combustion chamber 20 is formed between an upper surface 22 of the cylinder head 18 and the piston 14. A first fuel injector 24 is mounted in the cylinder head 18 with its discharge nozzle 26 positioned so as to inject a first volume of fuel into the combustion chamber 20.

A removable/replaceable housing 28 which defines an auxiliary or second combustion chamber 30 is threadingly and sealingly coupled to the head 18 of the engine 10. The housing 28 is further provided with a passage 32 which extends from the auxiliary combustion chamber 30 to the first combustion chamber 20. Fluid communication through the passage 32 between the auxiliary combustion chamber 30 and the first combustion chamber 20 is controlled by a valve 34. In particular, the valve 34 is moveable under the influence of a valve controller 36 between an extended position where the valve 34 provides high impedance to the flow of fluid from the auxiliary combustion chamber 30 to the first combustion chamber 20, and a retracted position where the valve 34 provides substantially unimpeded fluid flow between the chambers 30 and 20.

An auxiliary fuel and air injector 38 is threadingly and sealing coupled to the housing 28 and positioned so as to inject air and fuel into the auxiliary combustion chamber 30. As explained in eater detail below, the air injected into the auxiliary chamber 30 by the fuel and air injector 38 is sourced from outside of the cylinder 12. An ignition means in the form of a spark plug 40 is also threadingly engaged with the housing 28 at a location so that a spark produced by the spark plug 40 is able to ignite the fuel and air mixture within the auxiliary camber 30.

The controller 36 controls the engine 10 in a manner so that the fuel and air mixture injected by the injector 38 into the combustion chamber 30 is ignited by a spark from the spark plug 40 when the valve 34 is in the extended position, ie providing a high impedance to fluid flow, and prior to the piston 14 reaching top dead centre. The controller 36 further operates to move the valve 34 to the retracted position at a subsequent time so that the ignited fuel and air mixture within the auxiliary chamber 30 can flow through the passage 32 into the combustion chamber 20 where it can then react with fuel injected by the injector 24 and air within the chamber 20 to effect further combustion.

Looking at the engine in more detail, the auxiliary chamber 30 is of generally annular shape with the valve 34 having a member 35 extending through the centre of the annulus. The valve 34 is provided with a reduced diameter end 42 of a shape and configuration substantially complimentary to the shape of a throat portion 44 of the passage 32 at the end adjacent the auxiliary chamber 30. Ideally, the valve 34 is shaped and configured, and controlled by the controller 36 in a way so that it does not contact the throat 44 or the passage 32 of the housing 28. In this way, the valve 34, and 42, throat 44 and passage 32 are not subject to impact wear. The function of the valve 34 is not to provide a complete airtight seal between the auxiliary combustion chamber 30 and the first combustion chamber 20 but rather to provide a high impedance to the flow of air between the auxiliary combustion chamber 30 and the first combustion chamber 20. This high impedance is required during the compression stroke of the engine so as to allow substantially independent control of the air pressure within the auxiliary chamber 30. In the absence of the valve 34, air pressure within the auxiliary chamber 30 would be the same as that in the main combustion chamber 22 through the entirety of the stroke of the piston 14.

Typically, air injected by the fuel and air injector 38 is supplied by an engine driven compressor or similar device. This air is mixed with a metered amount of fuel to provide a fuel/air mixture of a predetermined ratio which is then injected by the auxiliary fuel and air injector 38 into the auxiliary combustion chamber 30. The particular ratio of fuel and air injected can be controlled by known means.

As the air injected by the fuel and air injector 38 is sourced from outside of the cylinder 12, the injection of fuel and air into the auxiliary chamber 30 is independent of the timing of the piston 14. Accordingly, fuel and air may be injected via the injector 38 into the auxiliary combustion chamber 30 immediately after the valve 34 has been moved to the extended position, for example when the piston 14 has completed its exhaust stroke.

The effective combustion chamber of the engine 10 is a divided combustion chamber engine because it includes the combination of the first combustion chamber 20, the auxiliary chamber 30 and the passage 32. The main combustion chamber 20 for each cylinder 12 of the engine 10 is formed by the volume defined between the cylinder head 12, upper surface 46 of the piston 14 and circumferential surface 48 of the engine block 16 above the surface 46. Of course, when the piston 14 is at top dead centre, this volume is at a minimum with the upper surface 46 of the piston 14 typically disposed above the circumferential surface 48 of the cylinder bore. The upper surface 46 with the piston 14 is provided with a concave recess or depression 50. To assist in the combustion process, the first fuel injector 24 and the housing 28 are relatively juxtaposed so that fuel injected from nozzle 26 of injector 24, and combustion products from the auxiliary combustion chamber 30 passing through the passage 32 are focused or targeted at the same point 52 in the recess 50.

The controller 36 is ideally a solenoid or other electrical/electronic controller so that the movement of the valve 34 can be controlled electronically so as to allow adaptive software control of the position of the valve 34. Although, it is further envisaged that the controller 36 may be in the form of a mechanical linkage allowing the position of the valve 34 to be controlled by a camshaft timing belt or other mechanical means.

The operation of the engine 10 will now be described. It is, however, to be understood that the engine 10 will consist of additional components to those described above such as crank shaft, inlet valves, outlet valves, camshafts, radiators, cooling jackets, fuel pumps etc. Such components can take any known form and do not constitute in part or any combination part of the present inventive concept. Further, while the above description is in relation to a single cylinder only, it is to be understood the engine 10 is most likely to include a plurality of identical cylinders.

Assume that the piston 14 is at bottom dead centre and commencing its compression stroke. The controller 36 operates to maintain the valve 34 in its extended position so as to provide high impedance to the flow of fluid through the throat 44 between the first combustion chamber 20 and the auxiliary combustion chamber 30. As the piston 14 commences to move towards top dead centre, the volume of the combustion chamber 20 deceases and air in the combustion chamber 20 inducted during a previous induction stroke is progressively compressed. At any desired time controlled by an engine management system (not shown) of the engine 10 and which may also control the controller 36, a predetermined volume of air and fuel is injected via the auxiliary injector 38 into the auxiliary combustion chamber 30. Since the valve 34 is in the extended position, there is very high fluid flow impedance between the combustion chamber 20 and the auxiliary combustion chamber 30 thus resulting in a substantial independence of pressure between the two chambers.

At a further desired moment thereafter, prior to the piston 14 reaching top dead centre, the spark plug 40 is operated to produce a spark which initiates combustion of the fuel and air within the auxiliary chamber 30. As the valve 34 is maintained at this time in the extended position, pressure within the chamber 30 rises very rapidly to its maximum pressure due to the combustion of the fuel therewithin. Further, as a result of the small size and volume of the chamber 30, flame propagation is very rapid.

At a desired moment, for example when the piston 14 has reached top dead centre, the controller 36 is operated to rapidly move the valve 34 to its retracted position allowing substantially unobstructed fluid communication between the auxiliary combustion camber 30 and the first combustion chamber 20. Although pressure within the auxiliary chamber 30 prior to the commencement of the combustion of the fuel therewithin may have been lower than maximum pressure achieved in the main chamber 20 when the piston 14 is at top dead centre, due to the combustion of fuel and air within the auxiliary chamber 30, pressure within the auxiliary chamber 30 is substantially higher than the chamber 20 when the valve 34 is moved to the retracted position. Consequently, burning air and fuel and the resulting combustion products move at high speed through the throat 44 and passage 32 into the combustion chamber 20. The rapid flow through the passage 32 ensures a thorough mixture of the burning fuel and air from the auxiliary chamber 30 with the air within the first chamber 20. Fuel is now injected via the first fuel injector 24 into the first combustion chamber 20. The high velocity of burning fuel and air passing through the passage 32 due to the high pressure differential between the auxiliary combustion chamber 30 and the combustion chamber 20; together with the presence of already burning fuel from the auxiliary combustion chamber 30 ensures that the fuel injected by the first injector 24 is very rapidly vaporised and combusted. Further, as previously described, the fuel injected via the first injector 24 and the burning air and fuel passing through passage 32 are directed to the same point 52 on the recess 50. This further assists in the mixing process within the first chamber 20 to further aid the combustion process. After completion of the exhaust stroke, when the cylinder pressure relates to only the relatively low exhaust back pressure, the controller 36 is operated to remove the valve 34 back to the extended position so as to provide high fluid flow impedance between the first chamber 20 and the auxiliary combustion chamber 30. The auxiliary combustion chamber 30 is now ready to receive a further injection of air and fuel in preparation for the next engine/piston cycle.

It would be appreciated by those skilled in the art that by sourcing the air for the auxiliary combustion chamber 30 from outside of the cylinder 12, ie by a compressor, embodiments of the present invention allow a substantial increase in the amount of time available for preparation of optimum conditions within the auxiliary combustion chamber 30 for fuel ignition. This is of substantial benefit when using fuels of lower volatility (ie lower grade fuels) as sufficient time can be provided to ensure that the fuel injected into the auxiliary chamber 30 is completed vaporised prior to ignition and further, is at an optimal pressure for ignition of the fuel. Further, the creation of auxiliary combustion within the chamber 30 produces very high thermal and kinetic energy levels which can be timed independent of the position of the piston 14 and thus timed for release into the first combustion camber 20 to produce the most effective and efficient combustion of the fuel injected into the first combustion chamber 20. It is envisaged that embodiments of this invention are able to avoid the normal detrimental high peak pressure problems created by ignition delay phenomena which hitherto has proven to be an unavoidable characterization with the use of diesel cycle methods and all late direct injection engines.

As the total combustion process is not strictly governed by the action of the piston 14 and the critical functions required in preparation for combustion are conducted in isolation, embodiments of the present invention can provide a timeframe approximately 24 times longer than conventional engines to fit with the chemical requirements for optimum combustion. Along with this, it can be shown mathematically that the combined energies released by the auxiliary chamber is at least one thousand fold greater than that of a spark plug. As a consequence of the unique way the embodiments of the present invention operate, the main combustion can now take place effectively, just as the main chamber starts to expand following the compression stroke, thus helping to reduce the peak combustion pressure and direct heat loss and ensuring significant advantages in reducing the formation of NOx emissions.

Now that an embodiment of the present invention has been described in detail it will be apparent to those skilled in the relevant arts that numerous modifications and variations may be made without departing from the basic inventive concepts. For example, prior to the valve 34 retracting, the main fuel injector could be operated to inject fuel into the main combustion chamber 20 thereby providing a ready mixture of air and vaporised fuel to be ignited when the valve 34 retracts. Further, the valve 34 could be retracted either immediately after combustion has started within the auxiliary chamber 30 and if the fuel has been injected and thoroughly mixed in the first combustion chamber 20, more conventional flame propagation methods can be used under the same engine conditions. It is further envisaged that control of when fuel is injected into the main chamber 20 via the first injector 24 can be controlled by any conventional fuel pump. In addition, whether the valve 34 opens almost simultaneously with combustion starting in the auxiliary chamber 30 and is ejected at a low pressure differential, or whether there is a higher pressure differential in the auxiliary chamber prior to the valve 34 opening may be controlled by the timing of the spark, using a shaft encoder and microprocessor techniques. The fuel/air ratio within the auxiliary chamber 30 and the first chamber 20 may also be controlled by conventional methods. Finally, the auxiliary chamber 30 may be supplied with a rich fuel/air mixture via the injector 38. When the valve 34 retracted there would be some partially combusted materials passing into the main chamber 20 whereupon the presence of the additional air allows completion of the combustion, and ideal conditions to immediately combust injecting main fuel. Further, while the present embodiment has been described in application to a reciprocating piston engine it may also be applied to other types of combustion engines such as, for example, a rotary (eg, Wankel) engine. In such an embodiment the cavity defined by the housing of the rotary engine is equivalent to he cylinder 12 of the present embodiment and the rotor equivalent to the piston 16.

All such modifications and variations together with others that would be apparent to those skilled in the relevant arts are deemed to be within the scope of the present invention the nature of which is to be determined from the above description and the appended claims.

What is claimed is:

1. An internal combustion engine comprising:
   a cavity in which a fuel can be combusted;
   a body moveable within said cavity, said cavity and moveable body together defining a first combustion chamber;
   a first fuel injector for injecting a first volume of fuel into said first combustion chamber;

a housing defining an auxiliary combustion chamber;

a passage extending from said auxiliary combustion chamber to said first combustion chamber;

a valve moveable between a first position where said valve provides a high impedance to fluid flow between said auxiliary combustion chamber and said first combustion chamber, and a second position where said valve provides substantially unimpeded fluid flow between said auxiliary combustion chamber and said first combustion chamber;

an auxiliary fuel and air injector for injecting a fuel/air mixture into said auxiliary combustion chamber, said fuel/air mixture comprising air sourced from outside of said first combustion chamber;

ignition means for igniting said fuel/air mixture in said auxiliary combustion chamber to produce an ignited fuel/air mixture for igniting said first volume of fuel; and, wherein said first fuel injector and said housing are juxtaposed so that fuel injected by said first fuel injector and said ignited fuel/air mixture discharged through said passage are targeted at the same point in said first combustion chamber.

2. An internal combustion engine according to claim 1 comprising a controller for controlling said engine so that said fuel/air mixture is ignited when said valve is in said first position and prior to said moveable body moving to a position where said first combustion chamber is of minimum volume, and for moving said valve to said second position at a subsequent time whereby said ignited fuel/air mixture is discharged through said passage into said first combustion chamber.

3. An internal combustion engine according to claim 2 wherein said controller is arranged to maintain said valve in said first position for a period after said igniting means ignites said fuel/air mixture sufficient so that pressure of said ignited fuel/air mixture is elevated to above pressure in said combustion chamber prior to said valve moving to said second position.

4. An internal combustion engine according to claim 1 wherein said valve is disposed in said housing.

5. An internal combustion engine according to claim 1 wherein said valve includes an end which obstructs an end of said passage adjacent said auxiliary combustion chamber when in said first position.

6. An internal combustion engine accordance to claim 1 wherein said valve includes a member which extends centrally through said auxiliary combustion chamber.

7. An internal combustion engine according to claim 1 wherein said moveable body is provided with a recess, and said first combustion chamber includes said recess.

8. An internal combustion engine in according to claim 7 wherein said point is on said recess.

9. An internal combustion engine according to claim 8 comprising an air compressor for providing air for said fuel/air mixture injected by said auxiliary fuel and air injector.

10. A method of making an internal combustion engine comprising:

providing a cavity in which a fuel can be combusted;

providing a body moveable within said cavity, said cavity and moveable body together defining a first combustion chamber;

providing a first fuel injector for injecting a first volume of fuel into said first combustion chamber;

providing a housing defining an auxiliary combustion chamber;

providing a passage extending from said auxiliary combustion chamber to said first combustion chamber;

providing a valve moveable between a first position where said valve provides a high impedance to fluid flow between said auxiliary combustion chamber and said first combustion chamber, and a second position where said valve provides substantially unimpeded fluid flow between said auxiliary combustion chamber and said first combustion chamber;

providing an auxiliary fuel and air injector for injecting a fuel/air mixture into said auxiliary combustion chamber, said fuel/air mixture comprising air sourced from outside of said first combustion chamber wherein said first fuel injector and said housing are juxtaposed so that fuel injected by said first fuel injector and said ignited fuel/air mixture discharged through said passage are targeted at the same point in said first combustion chamber; and, providing an igniter for igniting said fuel/air mixture in said auxiliary combustion chamber to produce an ignited fuel/air mixture for igniting said first volume of fuel.

11. The method of claim 10 further comprising providing a controller for controlling said engine so that said fuel/air mixture is ignited when said valve is in said first position and prior to said moveable body moving to a position where said first combustion chamber is of minimum volume, and for moving said valve to said second position at a subsequent time whereby said ignited fuel/air mixture is discharged through said passage into said first combustion chamber.

12. The method of claim 11 wherein said controller is arranged to maintain said valve in said first position for a period after said igniter ignites said fuel/air mixture sufficient so that pressure of said ignited fuel/air mixture is elevated to above pressure in said combustion chamber prior to said valve moving to said second position.

13. The method of claim 10 wherein said moveable body is provided with a recess, and said first combustion chamber includes said recess.

14. The method of claim 13 wherein said point is on said recess.

15. An internal combustion engine comprising:

a cavity in which a fuel can be combusted;

a body moveable within said cavity, said cavity and moveable body together defining a first combustion chamber;

a first fuel injector that injects a first volume of fuel into the first combustion chamber;

a housing defining an auxiliary combustion chamber and having a first end, the housing removably coupled at its first end to the internal combustion engine;

a passage extending from the auxiliary combustion chamber to the first combustion chamber;

a valve disposed in the housing and moveable between a first position where the valve provides a high impedance to fluid flow between the auxiliary combustion chamber and the first combustion chamber, and a second position where the valve provides substantially unimpeded fluid flow between the auxiliary combustion chamber and the first combustion chamber;

an auxiliary fuel and air injector for injecting a fuel/air mixture into the auxiliary combustion chamber, the fuel/air mixture comprising air sourced from outside of the combustion chamber; and, an igniter for igniting the fuel/air mixture in the combustion chamber to produce an ignited fuel/air mixture for igniting the first volume of fuel.

16. The internal combustion engine according to claim 15 wherein the passage is formed in the housing.

17. The internal combustion engine according to claim 16 further comprising a throat in the housing at an end of the passage adjacent the auxiliary combustion chamber and wherein the valve lies adjacent the throat when in the first position and is spaced a greater distance from the throat when in the second position.

18. The internal combustion engine according to claim 15 wherein the auxiliary fuel and air injector is coupled to the housing.

19. An internal combustion engine according to claim 15 further comprising a controller for controlling said engine so that said fuel/air mixture is ignited when said valve is in said first position and prior to said moveable body moving to a position where said first combustion chamber is of minimum volume, and for moving said valve to said second position at a subsequent time whereby said ignited fuel/air mixture is discharged through said passage into said first combustion chamber.

20. An internal combustion engine according to claim 15 wherein the controller is arranged to maintain the valve in the first position for a period after the igniter ignites said fuel/air mixture sufficient so that pressure of the ignited fuel/air mixture is elevated to above pressure in the combustion chamber prior to the valve moving to the second position.

21. An internal combustion engine according to claim 5 wherein the valve includes a member which extends centrally through the auxiliary combustion chamber.

22. An internal combustion engine according to claim 15 wherein the first fuel injector and said housing are juxtaposed so that fuel injected by said first fuel injector and said ignited fuel/air mixture discharged through the passage are targeted at the same point in the first combustion chamber.

23. An internal combustion engine according to claim 22 wherein said point is located in a recess formed in the moveable body.

24. An internal combustion engine according to claim 15 further comprising an air compressor for providing air for the fuel/air mixture injected by the auxiliary fuel and air injector.

* * * * *